US006663167B2

United States Patent
Phillips et al.

(10) Patent No.: US 6,663,167 B2
(45) Date of Patent: Dec. 16, 2003

(54) COLLAPSIBLE SHELTER/CAMPER/ STORAGE UNIT WITH A SUSPENDED FLOOR

(76) Inventors: Jeffrey O. Phillips, 1250 E. Nashville Church Rd., Ashland, MO (US) 65010; Eugene Gutwein, 7201 Hwy. HH, Columbia, MO (US) 65202

(*) Notice: Subject to any disclaimer, the term of this patent is extended or adjusted under 35 U.S.C. 154(b) by 0 days.

(21) Appl. No.: 09/855,811

(22) Filed: May 15, 2001

(65) Prior Publication Data

US 2002/0008406 A1 Jan. 24, 2002

Related U.S. Application Data

(60) Provisional application No. 60/204,108, filed on May 15, 2000.

(51) Int. Cl.[7] .................................................. B60P 3/34
(52) U.S. Cl. .................... 296/165; 296/159; 296/26.11; 296/100.1; 296/37.6; 135/88.13
(58) Field of Search ................................ 296/156, 160, 296/159, 164, 165, 100.06, 37.6, 100.07, 100.08, 100.09, 100.1, 26.11; 135/88.13, 88.14, 88.15

(56) References Cited

U.S. PATENT DOCUMENTS

| 3,411,519 | A | * | 11/1968 | Tyree et al. | |
|---|---|---|---|---|---|
| 3,704,039 | A | * | 11/1972 | Dean | |
| 4,394,100 | A | * | 7/1983 | Sperlich | 296/183 X |
| 4,544,195 | A | * | 10/1985 | Gunn | 296/165 X |
| 5,102,185 | A | * | 4/1992 | Lake | 296/165 |
| 5,118,156 | A | * | 6/1992 | Richard | 296/37.6 X |
| 5,213,390 | A | * | 5/1993 | Borchers | 296/165 |
| 5,335,960 | A | * | 8/1994 | Benignu, Jr. | 296/165 |
| 5,419,607 | A | * | 5/1995 | Oliveira | 296/159 |
| 5,421,633 | A | * | 6/1995 | Moore et al. | 296/165 |
| 5,558,392 | A | * | 9/1996 | Young | 296/157 |
| 5,927,783 | A | * | 7/1999 | Baka | 296/37.6 |
| 5,931,176 | A | * | 8/1999 | Isler et al. | 296/163 X |
| 5,951,095 | A | * | 9/1999 | Herndon | 296/165 |
| 5,957,525 | A | * | 9/1999 | Nelson | 296/165 |
| 6,030,026 | A | * | 2/2000 | Vega et al. | 296/159 |
| 6,068,319 | A | * | 5/2000 | OBrien | 296/37.6 |

* cited by examiner

*Primary Examiner*—Joseph D. Pape
(74) *Attorney, Agent, or Firm*—Shook, Hardy & Bacon LLP

(57) ABSTRACT

A shelter/camper/tent assembly for use in a truck bed. The assembly includes a shell and a floor, each being independently and pivotally coupled to the front of the truck bed. A support structure spans between the sidewalls of the truck and operates to suspend the floor in the truck bed. An opening structure is spaced along and secured to the side of the shell and support structure to support the shell when in the open position. A floor extension is pivotally coupled to the rear edge of the floor allowing for an increase in floor surface area. An attachment mechanism for removably securing the floor to the shell allowing for the two members to pivot about the front of the truck bed in unison. A flexible tent section is secured between the shell and floor through the use of fastening devices.

19 Claims, 4 Drawing Sheets

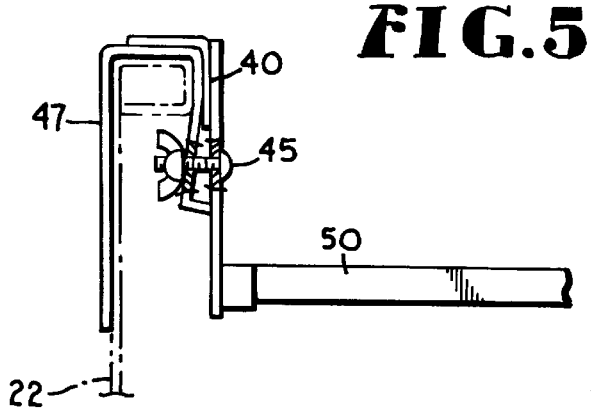
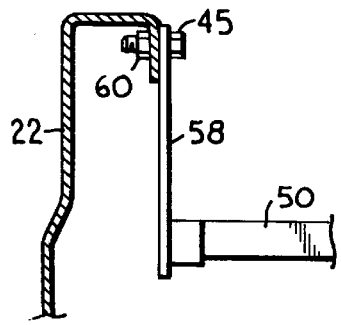
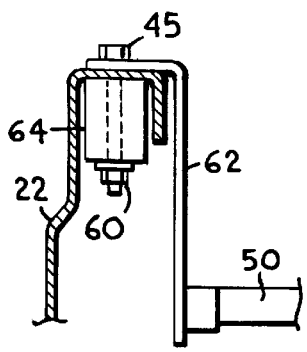
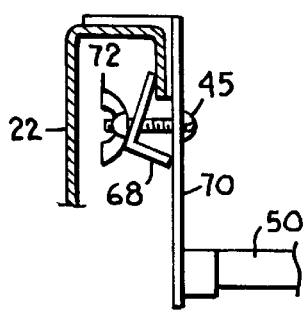
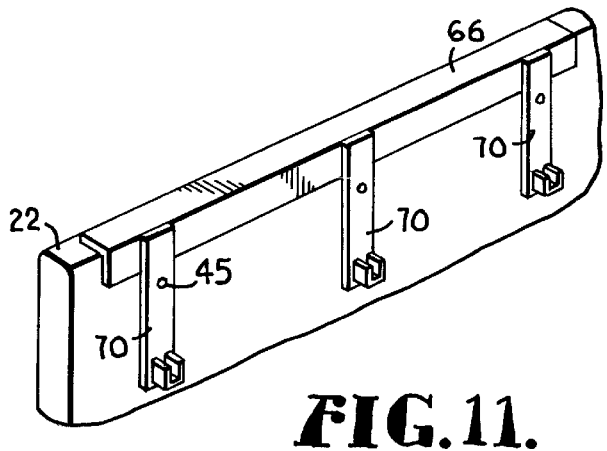

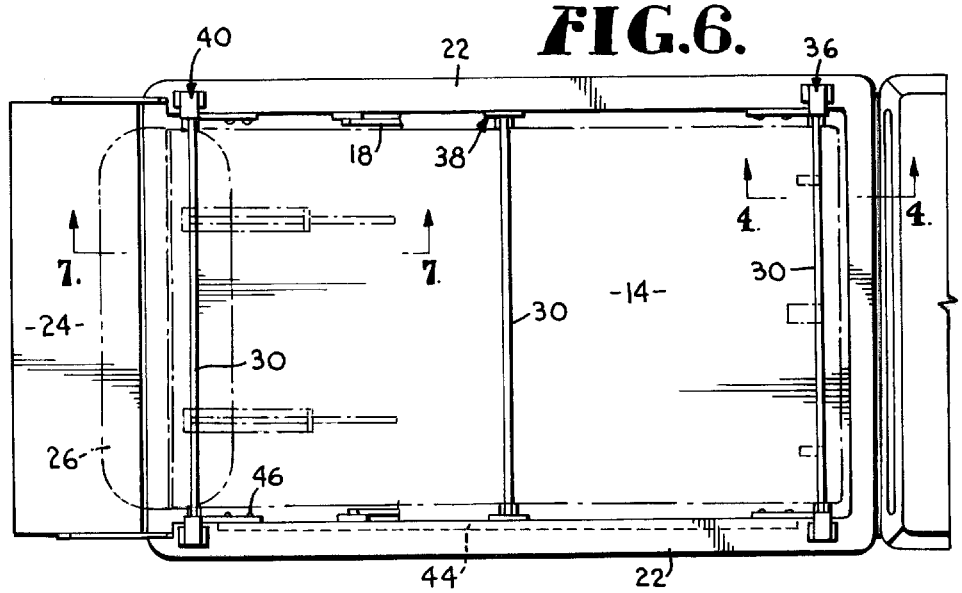
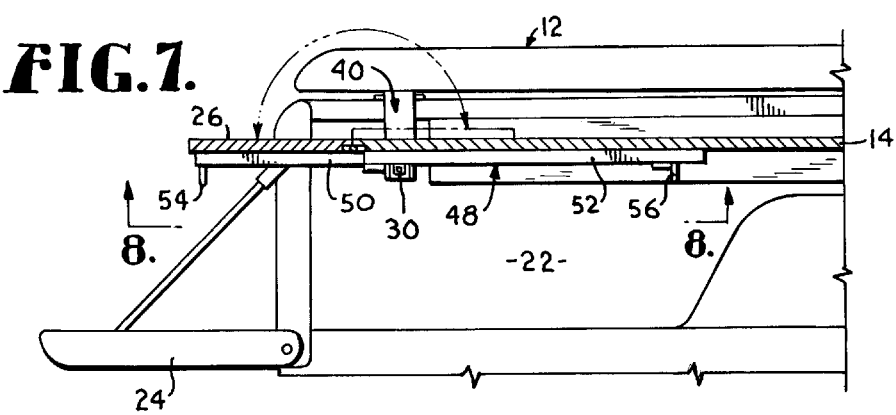
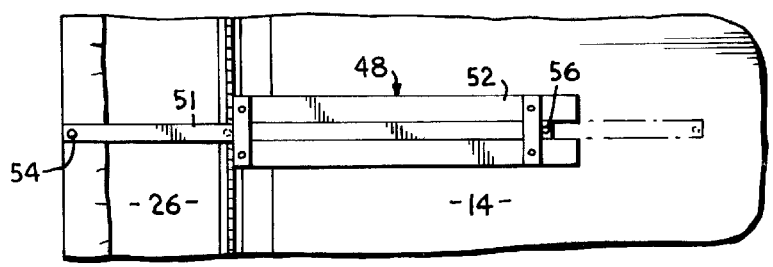

COLLAPSIBLE SHELTER/CAMPER/STORAGE UNIT WITH A SUSPENDED FLOOR

CROSS-REFERENCE TO RELATED APPLICATIONS

This application claims the benefit of Provisional Application No. 60/204,108, filed May 15, 2000.

STATEMENT REGARDING FEDERALLY SPONSORED RESEARCH OR DEVELOPMENT

Not Applicable.

1. Field of Invention

The present invention relates to a collapsible shelter/camper/storage unit with a suspended floor and, more particularly, to a collapsible shelter/camper/storage unit with a floor that can be placed over the bed of a pick-up truck or other surface that requires access to a space below the floor of the collapsible unit.

2. Background of the Invention

Dual purpose shelter/storage units which are carried and supported by vehicles are well known in the art. One type of conventional shelter/storage unit is constructed by pivotally coupling a shell to a floor member forming a V-shaped structure when in the open position. The shelter/storage unit can either be rigidly mounted to the top of a vehicle or removed from the top of the vehicle and placed on the ground to use the unit for shelter.

The current state of the art in shelter/storage units present a number of limitations. First, it is difficult to mount and stabilize conventional shelter/storage units on the roof of a pick-up truck. Typically, a series of support bars are mounted to the roof of the vehicle to stabilize the unit and enable a user to couple the unit to the vehicle. Specifically, the outer support bars must be spaced a sufficient distance apart to adequately stabilize the unit. Due to the small surface area of the roof on a pick-up truck, the outer support bars are not capable of being mounted a sufficient distance apart to properly stabilize the unit. If mounted on the roof of the truck, the unit would be subject to tipping and the support bars would be subject to a large amount of stress when excessive loading occurs at either end of the unit. Therefore, the surface area of a roof on a pick-up truck is inadequate for properly mounting a shelter/storage unit thereon.

Second, it is difficult to stabilize a shelter/storage unit in the bed of a pick-up truck. The width of unit is approximately equal to the distance between the side walls of a truck bed. The effective width between sidewalls of the truck bed is reduced by wheel wells that protrude into the corner of the truck bed between the side walls and the floor. Due to the wheel wells, the truck bed is not wide enough to accept the unit so that the floor of the unit rests flush with the floor of the truck bed. If placed in the truck bed, the unit would tip or wobble about the wheel wells.

Third, placing the unit within the truck bed negates some of the trucks storage capabilities. Once the unit is placed in the truck bed, the only available storage space would be within the unit itself. The amount of storage available would thereby be reduced since the storage space within the unit is smaller than the storage available in a truck bed. In addition, a user might be reluctant to store or transport certain items within the unit. For example, a user might be hesitant to store paint or other harmful chemicals because of the chance that those chemicals might spill within the unit. The residue that is unable to be removed from the unit could potentially give off fumes that could be harmful to a person sleeping in the unit.

Finally, conventional units do not provide adequate sleeping area. Specifically, the length of a typical unit is insufficient for allowing a user to stretch out and fully extend his or her legs and back.

Accordingly, there remains a need for a shelter/camper/storage unit which overcomes the above drawbacks and deficiencies. More specifically, there remains a need for a shelter/camper/storage unit that can be mounted to a pick-up truck. In addition, there remains a need for a shelter/camper/storage unit that can be mounted to a pick-up truck and allow for additional storage space underneath the unit. Further, there remains a need for a shelter/camper/storage unit that provides for additional surface area that allows a user to fully extend his or her body. The primary objective of this invention is to solve or substantially reduce the problems normally associated with known prior art shelter/camper/storage units.

SUMMARY OF THE INVENTION

A shelter/camper/tent assembly is provided that is secured to the sidewalls of a truck such that the floor is suspended above the floor of the bed of the truck. Alternatively, the shelter/camper/tent assembly can be affixed to or otherwise removably placed on a deck such as a deck of a home or of a boat. The assembly includes a shell hinged to the forward end of the truck bed and is collapsible. The shell includes pneumatic cylinders or spring lifts to facilitate opening and closing of the assembly. Alternately, once the shell is open support rods pivotally secured to the floor of the shell are extended and secured to the receiving brackets in the ceiling of the shell. A flexible tent body is secured to the upper shell and floor through the use of fastening devices such as clips or zippers. The floor of the apparatus sits on crossbars or braces which are mounted above the floor of the bed of the truck or, in the case of deck mounting, sits directly on the deck, or with the removal of some of the boards of the deck, can recess flush with the surrounding deck surface. The floor can be lifted thereby revealing the remaining portion of the truck bed or other underlying storage if used on a house or boat deck. This lifting can be assisted by utilizing the same pneumatic cylinder or spring lifts as are used to assist in the lifting of the shell. Alternatively, the floor can be supported in an upright position utilizing one of the support crossbars. The shell may be constructed with a small hanging cot or two cots extending across the interior side of the top shell proximate the back lower end thereof. These cots can be folded up into the underside of the interior of the top shell when not in use. Wheels and handles can be removably attached to the outside forward or rear end of the shell for portability.

BRIEF DESCRIPTION OF THE SEVERAL VIEWS OF THE DRAWING

In the following description of the drawings, in which like reference numerals are employed to indicate like parts in the various views:

FIG. 5A is an enlarged fragmentary sectional view of another method for the truck sidewall to receive the support structure of the present invention;

FIG. 6 is a plan view illustrating the support structure mounted in a truck bed;

FIG. 7 is a fragmentary elevational view taken along line 7—7 in FIG. 6; and

FIG. 8 is an enlarged fragmentary bottom plan view taken along line 8—8 in FIG. 7.

FIG. 9 is an enlarged fragmentary sectional view of another method for the truck sidewall to receive the support structure of the present invention;

FIG. 10 is an enlarged fragmentary sectional view of another method for the truck sidewall to receive the support structure of the present invention;

FIG. 11 is a fragmentary perspective view illustrating another support structure on the left side of the truck bed; and FIG. 12 is an enlarged fragmentary sectional view of another method for the truck sidewall to receive the support structure of the present invention.

DETAILED DESCRIPTION OF THE INVENTION

Figure 1:
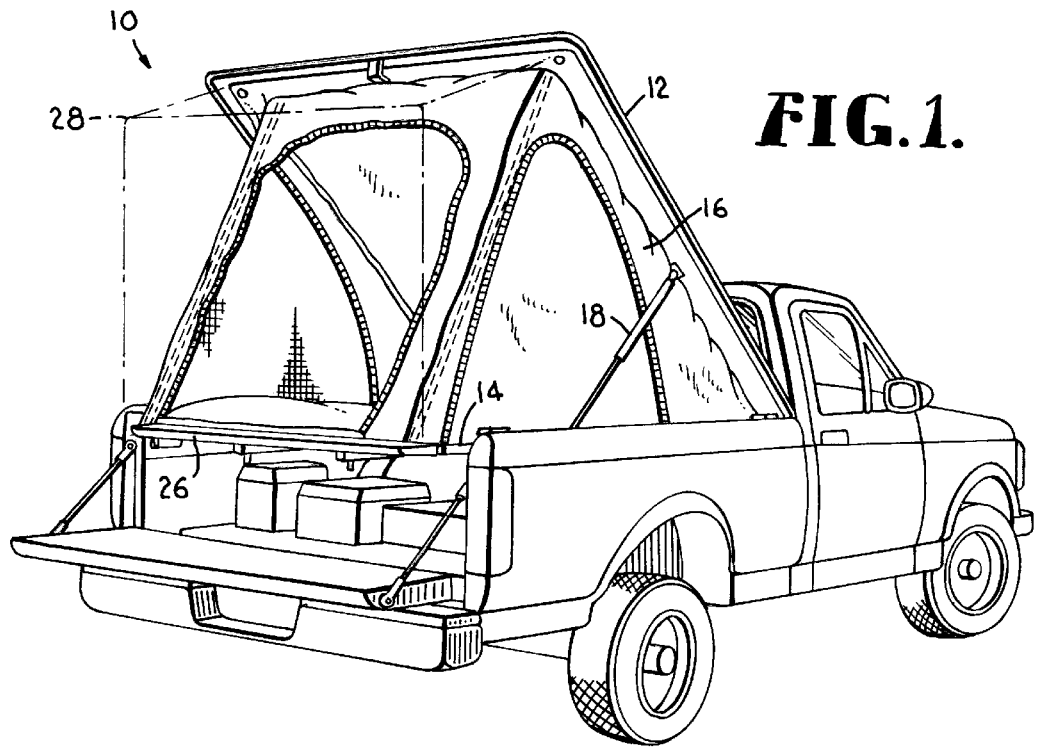
FIG. 1 is a rear perspective view of a collapsible shelter/camper/storage unit with the unit in an open position.
Figure 2:
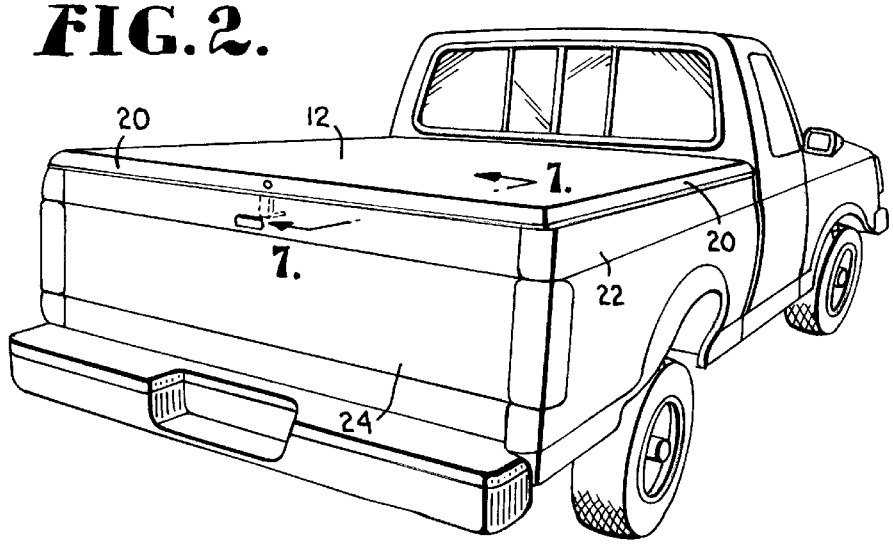
FIG. 2 is a rear perspective view of a collapsible shelter/camper/storage unit with the unit in a closed position.

Turning now to the drawings in greater detail, and initially to FIG. 1, a collapsible shelter/camper/storage unit of the present invention is designated generally by the reference number 10. The shelter/camper assembly 10 includes a shell 12, floor 14, a flexible tent section 16 spanning the opening between the shell 12 and the floor 14, and a pair of opening structures 18 to support the shell when in an opened position. FIG. 2 illustrates the collapsible shelter/camper unit with the unit in a closed position. The shell 12 has flanges 20 that extend over the outer side walls 22 of the truck bed and the tailgate 24.

Returning to FIG. 1, the floor 14 has a floor extension 26 pivotally connected to the rear end of the floor 14. Additionally, there is a tent extension 28 flexibly connected to the rear inner surface of the shell 12 that extends outward.

Figure 3:
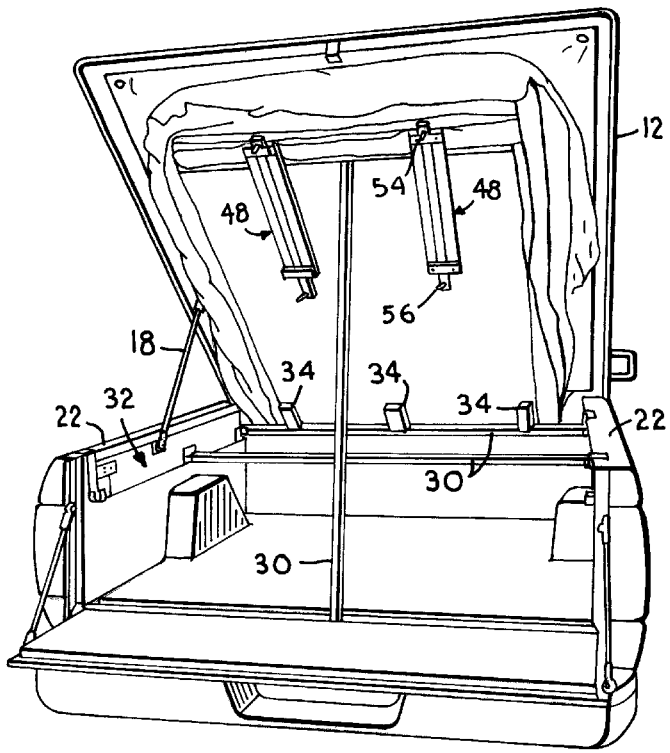
FIG. 3 is a rear perspective view of a collapsible shelter/camper/storage unit illustrating the floor in a rigidly upright position.
Figure 4:
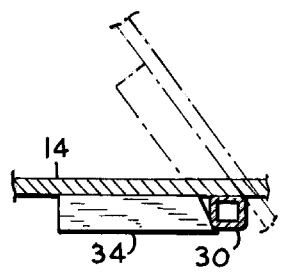
FIG. 4 is an enlarged fragmentary sectional view taken along line 4—4 of FIG. 6 illustrating the forward end of the floor pivoting about a cross-member.

FIG. 3 illustrates the floor in a rigidly upright position. When the floor is in a flat position, crossbars 30 are removably placed into the support structures 32 that are located along the interior of the left and right side walls 22 of the truck bed and spaced above the truck bed floor at a distance such that it is above the wheel wells of the truck bed. The support structures 32 will be described in further detail below. When in an open position, the rear crossbar 30 is removed from the supporting structures 32 and utilized to support the floor 14 in the upright position. Alternatively, the floor 14 may be held in an upright position by securing the floor 14 to the shell 12 utilizing straps (not shown) located along the outer edges of the floor 14 and shell 12 in conjunction with the opening structures 18. Preferably, opening structures 18 are pneumatic cylinders and are located and secured to approximately at the middle of the shell 12 and support structures 32. Blocks 34 are coupled with the forward bottom surface of the floor 14 to keep the floor in a static position when the unit is in use. FIG. 4 is an enlarged sectional view illustrating the forward end of the floor pivoting about cross member 30. When the floor 14 is in a lower or level position, blocks 34 prevent movement of the floor along the horizontal axis. When the floor is raised to access the truck bed, as shown in phantom lines, blocks 34 prevent the floor from slipping into the truck bed.

Figure 5:
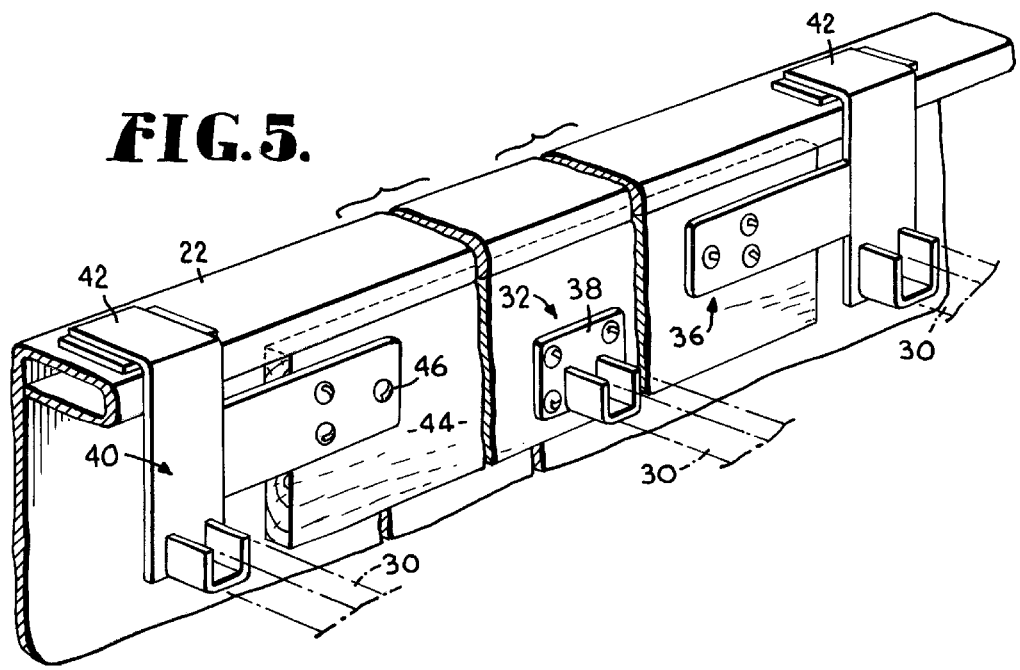
FIG. 5 is a fragmentary perspective view illustrating the support structure on the left side of the truck bed.

FIG. 5 is a fragmentary perspective view illustrating the support structure 32 removably coupled with the left sidewall 22 of the truck bed. An identical support structure is removably coupled with the right sidewall. The support structure 32 further includes mounting brackets 36, 38, 40 to removably receive crossbars 30. Forward bracket 36 and rear bracket 40 have horizontal surfaces 42 that rest on the top surface of the truck sidewall 22 of the truck bed. Forward bracket 36, middle bracket 38 and rear bracket 42 are fixedly connected to support rail 44. When the brackets 36 38, 40 and support rail 44 are assembled, the entire supporting structure 32 is placed into the truck bed along the inner side of the sidewall 22. Preferably, the mounting brackets 36, 38, 42 are secured to the support rail 44 utilizing bolts or screws 46. Alternatively, support structure 32 may be removably coupled with the sidewall 22 utilizing c-clamps (not shown) to fasten the support rail 44 to the underside edge along the top of sidewall 22. Additionally, FIGS. 5a, 9 and 10 illustrate alternative methods for securing support structure 32 to the truck bed. As best seen in FIG. 5a, support structure 32 is removably coupled to sidewall 22 using clips or clamps 47 that are removably secured to support structure 32 with bolt 45 and placed over the top and inner and outer sides of sidewall 22. FIG. 6 is a top plan view illustrating the crossbars 30 in connection with the support structures 32. Mounting brackets 36, 38, 40 are arranged across from each other on the opposite sides of each of the sidewalls 22 to removably receive the crossbars 30. A second alternative method is best seen in FIG. 9 and includes a simple hanger 58 with a receiver portion sized to allow crossbar 50 to fit therein. A bolt 45 and nut 60 is used to mount hanger 58 on the portion of sidewall 22 that faces inwardly toward the truck bed. It should be understood that hanger 58 could be attached to sidewall by another type of fastening mechanism, such as, but not limited to a self-tapping screw, welding or the like. A third alternative method is illustrated in FIG. 10 and includes a L-shaped hanger 62 that includes a receiver portion sized to allow crossbar 50 to fit therein. Hanger 62 is mounted to the top portion of sidewall 22 by using bolt 45, nut 60 and a stake pocket 64. Hanger 62 is placed on the top portion of sidewall 22, and bolt 45 enters downwardly through hanger 62, sidewall 22 and stake pocket 64. Nut 60 is then threaded on the end of bolt 45 and tightened to squeeze stake pocket 64 between nut 60 and the top portion of sidewall 22. Stake pocket 64 provides resistance to prevent nut 60 from coming loose from bolt 45. Additionally, as best seen in FIGS. 11 and 12, an alternative structure 66 can be used to support crossbars 50. Support structure 66 extends along the length of each sidewall 22 for added lateral support. Support structure is removably coupled to sidewall 22 by a L-shaped clip or clamp 68. Specifically, structure 66 is fastened between sidewall 22 and a hanger 70 by tightening bolt 45 with fly nut 72 to force clamp against the inner portions of sidewall 22 and hanger 70. In all of the methods described in FIGS. 5, 5a and 9–12, a pin, not shown, could be used to secure crossbar 50 to support structures 32, 66 to secure crossbar 50 to the receiver portion of support structure 32. For example, when a vehicle containing unit 10 is traveling over rugged terrain or is being used as a camper, pins keep crossbars 50 from shaking or rattling, thus improving the stability of the entire suspended platform.

FIGS. 6, 7 and 8 illustrate the floor extension 26 in greater detail. Extension supports 48 include a slidable member 51, a pair of static members 52 fixedly connected to the bottom surface of the floor 14 and spaced apart a distance to receive slidable member 51. The slidable member 51 further has a rear stop 54 and a forward stop 56.

In operation, when the collapsible shelter/camper unit is in an open position with the shell 12 being supported by the opening structures 18, a V-shape is formed between the shell 12 and the floor 14, with the pivoting point at the forward end of the truck bed. The floor extension 26 is pivotally unfolded in a rearward direction to provide further sleeping room for the occupants of the tent structure. When the floor extension 26 is folded out, the slidable members 54 of the extension supports 48 are pulled in a rearward position to provide support for the floor extension 26.

With the camper or shelter in open position with the shell raised, the user can access the truck bed by raising the floor 14 and supporting the floor 14 using the rearmost crossbar 30 and placed into position as shown in FIG. 3. Alternatively, the rearmost crossbar can stay in position and a support bar pivotally attached to the underside of the floor 14 can be moved into position to rest on the upper side of the rearmost crossbar. This allows one person to easily access the storage space beneath the floor.

Constructed and operated as previously described, in a preferred embodiment, the collapsible camper unit is configured such that the floor 14 of the unit rests above the truck bed floor so that a storage space is created in the truck bed approximately at a height slightly greater than the wheel well height. This allows the user to have a portable camper or shelter without losing the benefit of the storage space of a pickup truck or the pick up truck bed.

Although the invention has been described with reference to a preferred embodiment as illustrated in the attached drawing figures, it is noted that substitutions may be made and equivalents employed herein without departing from the scope of the invention as recited in the claims.

I claim:

1. A portable, collapsible shelter/camper/storage unit for use in a truck bed having a forward end portion, a tailgate and sidewalls, the shelter/camper/storage unit comprising:
    a shell having a body section with front, rear and side edges, the front edge pivotally coupled at the forward end portion of the truck bed;
    a support structure coupled with the side walls of the truck bed having at least two mounting brackets arranged opposite from each other to receive a corresponding number of crossbars;
    a floor having a front and rear edge suspended in the truck bed supported by at least two of the crossbars forming a space between said shell and said floor, wherein said forward edge of said floor is pivotally coupled to said crossbar at the forward end portion of the truck bed, and wherein said floor is capable of pivoting independent of said shell; and
    a flexible tent section having front, back and side walls with top and bottom edges substantially spanning the space between said shell and said floor.

2. A portable, collapsible shelter/camper/storage unit for use in a truck bed having a forward end portion, a tailgate and sidewalls, the shelter/camper/storage unit comprising:
    a shell having a body section with front, rear and side edges, the front edge pivotally coupled at the forward end portion of the truck bed;
    a support structure coupled with the side walls of the truck bed having at least two mounting brackets arranged opposite from each other to receive a corresponding number of crossbars;
    a floor having a front and rear edge suspended in the truck bed supported by at least two of the crossbars forming a space between said shell and said floor;
    a flexible tent section having front, back and side walls with top and bottom edges substantially spanning the space between said shell and said floor; and
    means for removably securing said floor to said shell, wherein when said floor and said shell are secured to one another, said floor and said shell pivot about the forward end portion of the truck bed in unison.

3. A portable, collapsible shelter/camper/storage unit for use in a truck bed having a forward end portion, a tailgate and sidewalls, the shelter/camper/storage unit comprising:
    a shell having a body section with front, rear and side edges, the front edge pivotally coupled at the forward end portion of the truck bed;
    a support structure coupled with the side walls of the truck bed having at least two mounting brackets arranged opposite from each other to receive a corresponding number of crossbars;
    a floor having a front and rear edge suspended in the truck bed supported by at least two of the crossbars forming an opening between said shell and said floor;
    a flexible tent section having front, back and side walls with top and bottom edges substantially spanning the opening between said shell and said floor; and
    a floor extension that is coupled to the rear edge of said floor, wherein said floor extension can be selectively extended to increase the surface area of said floor.

4. The portable, collapsible shelter/camper/storage unit as recited in claim 3, wherein said floor extension is pivotally coupled to the rear edge of said floor.

5. The portable, collapsible shelter/camper/storage unit as recited in claim 4, further comprising an extension support that is coupled to said floor wherein said extension support provides support for said floor extension.

6. A portable, collapsible shelter/camper/storage unit comprising:
    a shell and a floor, each having a body section with front, rear and side edges;
    means for pivotally securing said front edges of said shell and said floor such that said shell and said floor form a V-shape when said shell is erected to an open position; and
    a floor extension that is coupled to the rear edge of said floor, wherein said floor extension can be selectively extended to increase the surface area of said floor.

7. The portable, collapsible shelter/camper/storage unit as recited in claim 6, wherein said floor extension is pivotally coupled to the rear edge of said floor.

8. The portable, collapsible shelter/camper/storage unit as recited in claim 7, further comprising an extension support that is coupled to said floor, wherein said extension support provides support for said floor extension.

9. The portable, collapsible shelter/camper/storage unit as recited in claim 6, further including a support structure having at least two mounting brackets arranged opposite from each other and adjacent to said floor to receive a corresponding number of crossbars, wherein said floor is capable of being suspended above a surface when supported by at least two of the crossbars forming a space between said shell and said floor.

10. The portable, collapsible shelter/camper/storage unit as recited in claim 6, wherein said floor is capable of pivoting independently of said shell.

11. The portable, collapsible shelter/camper/storage unit as recited in claim 6, further comprising means for removably securing said floor to said shell, wherein when said floor and said shell are secured to one another, said floor and said shell pivot in unison.

12. The portable, collapsible shelter/camper/storage unit as recited in claim 6, further comprising at least one opening structure coupled to the side edges of said shell and said floor to support said shell when in an open position.

13. The portable, collapsible shelter/camper/storage unit as recited in claim 6, wherein said opening structure is a pneumatic cylinder.

14. A portable, collapsible shelter/camper/storage unit for use in a truck bed having a bed with a forward end portion, a tailgate and sidewalls, the shelter/camper/storage unit comprising:
- a shell having a body with front, side and rear edges, the front edge being pivotally coupled at the forward end portion of the truck bed;
- support means coupled with the side walls of the truck bed, said support means having at least two mounting brackets arranged opposite from each other to receive a corresponding number of crossbars;
- a floor having a front and rear edge suspended in the truck bed supported by said support means forming a space between said shell and said floor, wherein the floor extends from the forward end portion of the truck bed to the tailgate;
- a flexible tent section having front, back and side walls with top and bottom edges substantially spanning the space between said shell and said floor.

15. The portable, collapsible shelter/camper/storage unit as recited in claim 14, further comprising an attachment means for removably securing said floor to said shell, wherein when said floor and said shell are removably secured to one another, said floor and said shell pivot about the forward end portion of the truck bed in unison.

16. The portable, collapsible shelter/camper/storage unit as recited claim 14, wherein said front edge of said floor is pivotally coupled to said crossbar at the forward end portion of the truck bed enabling said floor to pivot independently of said shell.

17. The portable, collapsible shelter/camper/storage unit as recited in claim 14, further comprising a floor extension means coupled to the rear edge of said floor, wherein said extension means can be selectively extended to increase the surface area of said floor.

18. The portable, collapsible shelter/camper/storage unit as recited in claim 17, wherein said floor extension means is pivotally coupled to the rear edge of said floor.

19. The portable, collapsible shelter/camper/storage unit as recited in claim 18, further comprising an extension support that is coupled to said floor wherein said extension support provides support for said floor extension means.

* * * * *